US012638087B2

(12) United States Patent
Trewhella

(10) Patent No.: US 12,638,087 B2
(45) Date of Patent: May 26, 2026

(54) BALL VALVES AND PROCESSES OF USING SAME

(71) Applicant: Ross J. Trewhella, Burnet, TX (US)

(72) Inventor: Ross J. Trewhella, Burnet, TX (US)

( * ) Notice: Subject to any disclaimer, the term of this patent is extended or adjusted under 35 U.S.C. 154(b) by 257 days.

(21) Appl. No.: 18/401,371

(22) Filed: Dec. 30, 2023

(65) Prior Publication Data

US 2025/0215982 A1     Jul. 3, 2025

(51) Int. Cl.
*F16K 5/06* (2006.01)
*F16K 27/06* (2006.01)

(52) U.S. Cl.
CPC .......... *F16K 5/0605* (2013.01); *F16K 27/067* (2013.01)

(58) Field of Classification Search
CPC .............................. F16K 5/0605; F16K 27/067
USPC ......................................... 251/315.01–315.16
See application file for complete search history.

(56) References Cited

U.S. PATENT DOCUMENTS

| | | | | |
|---|---|---|---|---|
| 3,007,669 | A | * | 11/1961 | Fredd ...................... E21B 34/10 |
| | | | | 251/315.1 |
| 3,253,518 | A | | 5/1966 | Duemler |
| 3,394,632 | A | | 7/1968 | Priese |
| 3,675,675 | A | | 7/1972 | Wedge |
| 3,772,966 | A | | 11/1973 | Mills |
| 4,072,271 | A | | 2/1978 | Voss |
| 4,225,110 | A | | 9/1980 | Akkerman et al. |
| 4,234,047 | A | | 11/1980 | Mott |

| | | | | |
|---|---|---|---|---|
| 4,475,598 | A | * | 10/1984 | Brakhage, Jr. .......... E21B 34/10 |
| | | | | 166/321 |
| 4,646,840 | A | | 3/1987 | Bartholomew et al. |
| 4,658,904 | A | * | 4/1987 | Doremus .............. E21B 34/045 |
| | | | | 137/614.19 |
| 4,700,782 | A | * | 10/1987 | Read ...................... E21B 34/12 |
| | | | | 166/330 |
| 4,762,180 | A | | 8/1988 | Wybro et al. |
| 5,167,283 | A | | 12/1992 | Smith |
| 6,015,013 | A | | 1/2000 | Edwards |
| 6,082,391 | A | | 7/2000 | Theibaud et al. |
| 6,321,844 | B1 | | 11/2001 | Theibaud et al. |
| 6,668,933 | B2 | | 12/2003 | Kent |
| 6,729,392 | B2 | | 5/2004 | Deberry |
| 7,367,357 | B2 | | 5/2008 | Kim |
| 7,434,624 | B2 | | 10/2008 | Wilson |

(Continued)

FOREIGN PATENT DOCUMENTS

| | | |
|---|---|---|
| EP | 0470972 A1 | 2/1992 |
| EP | 0718531 A1 | 6/1996 |

(Continued)

OTHER PUBLICATIONS

Korean Intellectual Property Office, International Search Report in PCT/US2024/039930, Sep. 3, 2025 (3 pages).

(Continued)

*Primary Examiner* — John Bastianelli
(74) *Attorney, Agent, or Firm* — The Wendt Firm, P.C.; Jeffrey L. Wendt

(57)     ABSTRACT

Ball valves, ball elements used therein, and processes for using same in cutting operations and fluid or slurry flow regulation feature a second set of ball rotation pins that mount to a second piston that is hydraulically driven in the opposite direction of a first piston. In certain embodiments the pistons move perpendicularly to a direction of flow through the ball valve.

17 Claims, 9 Drawing Sheets

(56) References Cited

U.S. PATENT DOCUMENTS

| | | | |
|---|---|---|---|
| 8,403,293 | B2 | 3/2013 | Cowie |
| 8,863,596 | B2 | 10/2014 | Holtgraver |
| 8,960,302 | B2 | 2/2015 | Shilling et al. |
| 9,297,214 | B2 | 3/2016 | Shilling et al. |
| 9,506,319 | B2 | 11/2016 | Kalb et al. |
| 9,964,212 | B2 | 5/2018 | Kamp et al. |
| 10,450,834 | B2 | 10/2019 | Manett et al. |
| 11,131,405 | B1 | 9/2021 | Bonomi |
| 11,613,965 | B2 | 3/2023 | Chevallier et al. |
| 11,661,848 | B2 | 5/2023 | Berkovitz et al. |
| 2003/0150620 | A1 | 8/2003 | Deberry |
| 2006/0196566 | A1 | 9/2006 | Kim |
| 2007/0044972 | A1 | 3/2007 | Roveri et al. |
| 2008/0105845 | A1 | 5/2008 | Yeary |
| 2008/0223583 | A1 | 9/2008 | Roveri et al. |
| 2009/0045368 | A1 | 2/2009 | Cowie |
| 2009/0184278 | A1* | 7/2009 | Beall ..................... E21B 34/14 |
| | | | 251/315.1 |
| 2010/0051847 | A1 | 3/2010 | Mailand et al. |
| 2011/0198527 | A1 | 8/2011 | Cowie |
| 2013/0299730 | A1 | 11/2013 | Hills |
| 2014/0175317 | A1 | 6/2014 | Tennant |
| 2014/0217320 | A1 | 8/2014 | DeOcampo et al. |
| 2015/0315870 | A1 | 11/2015 | Kalb |
| 2017/0370180 | A1 | 12/2017 | Manett |
| 2021/0148192 | A1 | 5/2021 | Fox |
| 2021/0285565 | A1 | 9/2021 | Bonomi |
| 2022/0081994 | A1 | 3/2022 | Chevallier |
| 2022/0403949 | A1 | 12/2022 | Nagtilak et al. |
| 2023/0203914 | A1 | 6/2023 | Chevallier |

FOREIGN PATENT DOCUMENTS

| | | | |
|---|---|---|---|
| EP | 0839256 | A1 | 5/1998 |
| EP | 1478825 | A1 | 11/2004 |
| EP | 1798367 | A2 | 6/2007 |
| EP | 1825176 | A1 | 8/2007 |
| EP | 2635828 | A1 | 9/2013 |
| EP | 2737165 | A2 | 6/2014 |
| EP | 2895683 | A1 | 7/2015 |
| EP | 3245379 | B1 | 11/2017 |
| WO | WO1990013764 | A2 | 11/1990 |
| WO | WO1997004210 | A1 | 2/1997 |
| WO | WO2001042695 | A1 | 6/2001 |
| WO | WO2003067024 | A1 | 8/2003 |
| WO | WO2003104692 | A1 | 12/2003 |
| WO | WO2006064215 | A1 | 6/2006 |
| WO | WO2012059765 | A1 | 5/2012 |
| WO | WO2013014439 | A2 | 1/2013 |
| WO | WO2013125979 | A1 | 8/2013 |
| WO | WO2014011639 | A1 | 1/2014 |
| WO | WO2014042622 | A1 | 3/2014 |
| WO | WO2016113525 | A1 | 7/2016 |
| WO | WO2017017601 | A1 | 2/2017 |
| WO | WO2020032920 | A1 | 2/2020 |
| WO | WO2021040532 | A1 | 3/2021 |
| WO | WO2022060385 | A1 | 3/2022 |

OTHER PUBLICATIONS

Korean Intellectual Property Office, Written Opinion of the International Search Authority in PCT/US2024/039930, Sep. 3, 2025 (8 pages).

* cited by examiner

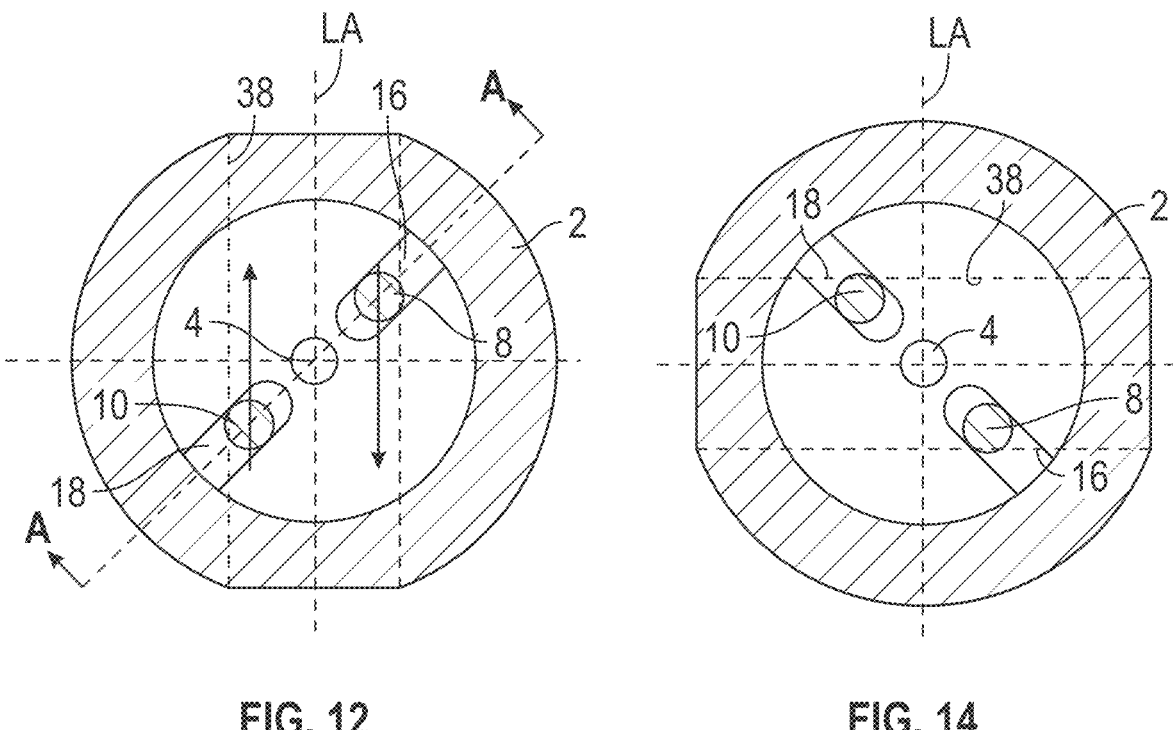
FIG. 12
FIG. 14
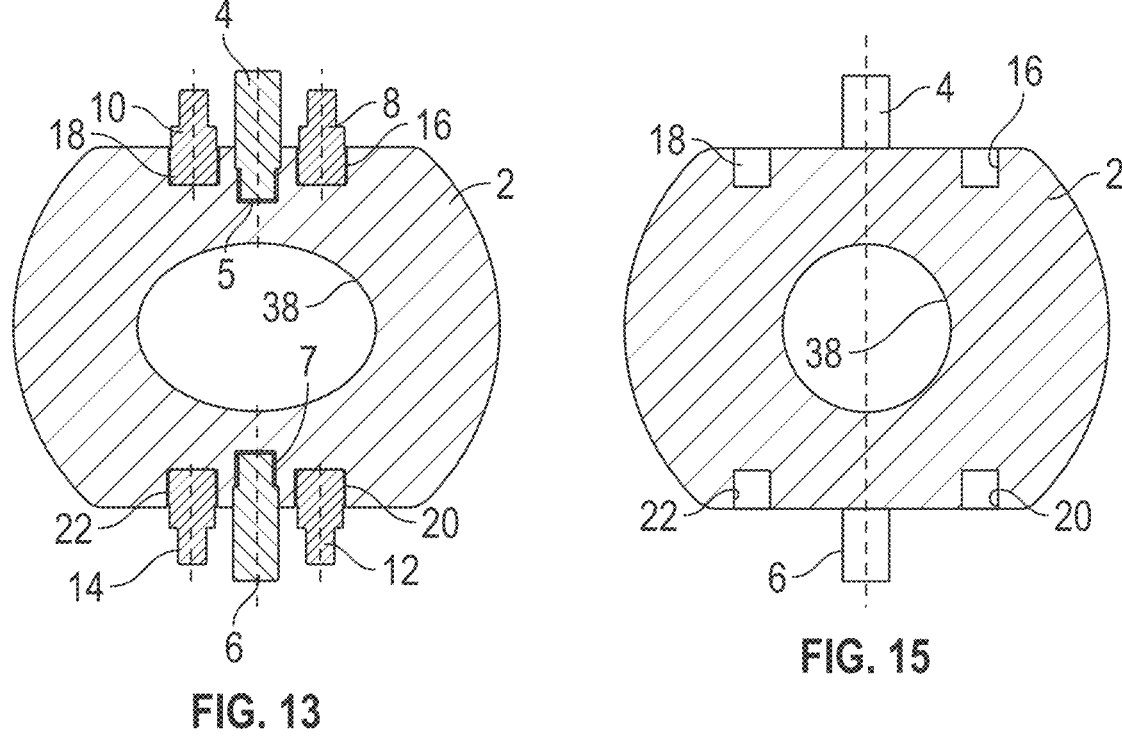
FIG. 13
FIG. 15

Figure 16:
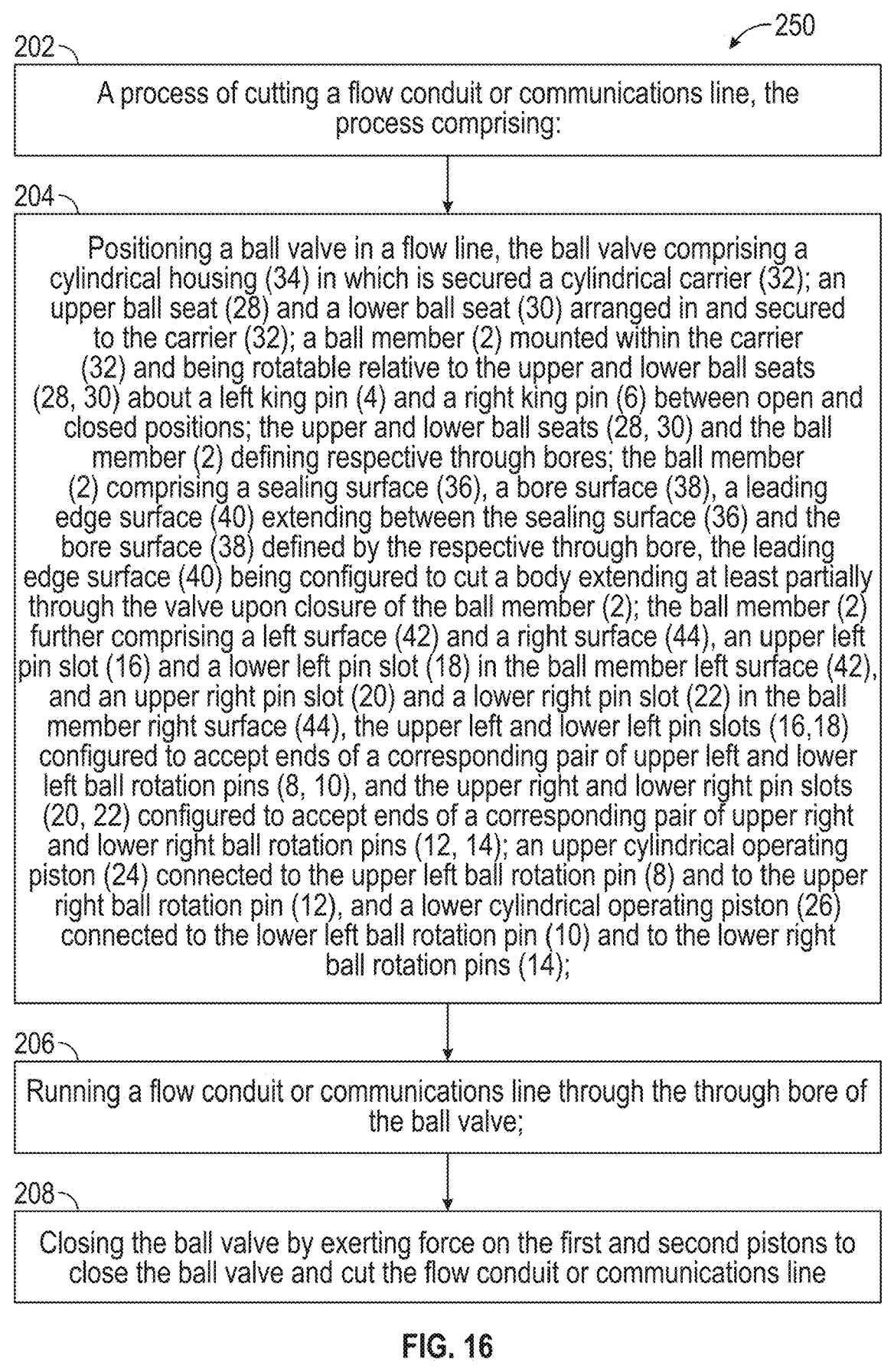

250

202

A process of cutting a flow conduit or communications line, the process comprising:

204

Positioning a ball valve in a flow line, the ball valve comprising a cylindrical housing (34) in which is secured a cylindrical carrier (32); an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28, 30) and the ball member (2) defining respective through bores; the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2); the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16,18) configured to accept ends of a corresponding pair of upper left and lower left ball rotation pins (8, 10), and the upper right and lower right pin slots (20, 22) configured to accept ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14);

206

Running a flow conduit or communications line through the through bore of the ball valve;

208

Closing the ball valve by exerting force on the first and second pistons to close the ball valve and cut the flow conduit or communications line

A process of regulating a flow in a conduit, the process comprising:

304

Positioning a ball valve in a flow line, the ball valve comprising a cylindrical housing (34) in which is secured a cylindrical carrier (32); an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28, 30) and the ball member (2) defining respective through bores; the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2); the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) configured to accept ends of a corresponding pair of upper left and lower left ball rotation pins (8, 10), and the upper right and lower right pin slots (20, 22) configured to accept ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14);

306

Flowing a fluid or slurry through the ball member through bore while the ball member is in an open position;

308

Exerting force on the first and second pistons to partially or fully close the ball valve to regulate the flow in the conduit

FIG. 17

BALL VALVES AND PROCESSES OF USING SAME

BACKGROUND INFORMATION

Technical Field

The present disclosure relates to ball valves and processes of using same, in particular to riser ball valves useful for subsea operations in the marine subsea (offshore subsea) hydrocarbon production field. In particularly, the present disclosure relates to ball valves and processes useful for performing a variety of subsea operations controlled from one or more surface vessels, where such work needs to be done safely, either while such facilities are in operation, or during facility shutdowns, adverse weather events, and the like.

Background Art

As explained in several U.S. Patents, including U.S. Pat. No. 9,506,319 B2, a ball valve is a type of valve that uses a spherical ball as a closure mechanism. The ball has a hole therethrough that is aligned with the direction of flow when the valve is opened and misaligned with the direction of flow when the valve is closed. Ball valves have many applications in well tools for use downhole in a wellbore, for example, as formation tester valves, safety valves, and in other downhole applications. Many of these well tool applications use a ball valve because ball valves can have large through bore for passage of tools, tubing strings, and flow, yet also be compactly arranged, for example, having a cylindrical outer profile that corresponds to the cylindrical outer profile of the remainder of the string carrying the ball valve into the wellbore and presenting few or no protrusions to hang up on the interior of the well.

Conventional systems use a pair of pins carried by a single hydraulically operated piston. Each pin is engaged within a slot on the top and bottom faces of the ball. Because the pins are mounted opposite each other and offset to the ball centerline the linear motion of the piston will drive the pins within the ball slot causing the constrained ball to rotate through the prescribed 90 deg.

In these known ball valves, the single set of ball rotation pins are mounted to a single piston that when driven hydraulically moves in a single direction to open the valve and the opposite direction to close the valve. This has several disadvantages. As the ball rotates about the centerline, forces are not balanced. Ball rotation is dependent on the ball rotation being the result of a reaction force such as from the ball seat. This ball to seat interface can cause extremely high friction particularly if the ball is required to cut an internally conveyed conduit such as wire or coiled tubing. Furthermore, and again relating to the cutting action of the ball, with only a single set of ball rotation pins the strength of the mechanism is sometimes inadequate to cut conveyed conduit, and/or the cutting edges may become damaged. And since pins are the major failure point in these ball valves, having only one set of pins increases the rate of failure.

Various efforts in this area may be exemplified by U.S. Pat. Nos. 10,450,834; 11,613,965 and U.S. Published patent application No. 20140175317A1; and WO/2003/104692A1. However, none of these documents disclose or teach ball valves as taught by the present disclosure.

As may be seen, current practice may not be adequate for all circumstances, and at worst may result in premature valve failure. There remains a need for more safe, robust ball valves for subsea and other high-pressure operations. The ball valves and processes of the present disclosure are directed to these needs.

SUMMARY

In accordance with the present disclosure, ball valves, ball elements therefore, and processes of using same are described which reduce or overcome many of the faults of previously known ball valves and processes.

The ball elements used in ball valves of the present disclosure feature a second set of ball rotation pins that mount to a second piston that is hydraulically driven in the opposite direction of a first piston.

This has the advantage that the ball rotates about the centerline and forces are balanced, and the rotation of the ball is not dependent on the ball rotation being the result of a reaction such as a seat. Moreover, again relating to the cutting action of the ball, the addition of a second set of pins doubles the strength of the mechanism.

A first aspect of the disclosure are ball valves comprising (or consisting essentially of, or consisting of):

a) a housing;

b) a ball seat arranged in the housing;

c) a ball member mounted within the housing and being rotatable relative to the ball seat between open and closed positions, d) the ball seat and the ball member defining respective through bores;

e) the ball member comprising a sealing surface, a bore surface, a leading edge surface extending between the sealing surface and the bore surface defined by the respective through bore, the leading edge surface being configured to cut a body extending at least partially through the valve upon closure of the ball member, f) the ball member further comprising a top surface and a bottom surface, a first pair of slots in the top surface, and a second pair of slots in the bottom surface, the first pair of slots configured to accept ends of a corresponding pair of top ball rotation pins, and the second pair of slots configured to accept ends of a corresponding pair of bottom ball rotation pins, g) a first cylindrical piston connected to one of the top ball rotation pins and to one of the bottom ball rotation pins, and a second cylindrical piston connected to a second one of the top ball rotation pins and to a second one of the bottom ball rotation pins, such that when the pistons are driven towards the ball member in opposite directions, the ball member rotates to the closed position.

The respective through bores of the ball seat and the ball member define a flow path through the valve, wherein the ball member is rotated relative to the ball seat to misalign the respective through bores to prevent or restrict flow through the valve and is rotated relative to the ball seat to align the respective through bores to permit or increase flow through the valve.

A second aspect of the disclosure are ball elements for ball valves of the first aspect of the disclosure.

A third aspect of the disclosure is a process comprising (or consisting essentially of, or consisting of):

a) positioning the ball valve of the first aspect of the disclosure in a flow line;

b) running a flow conduit or communications line through the through bore of the ball valve and the ball element;

c) closing the ball valve by exerting force on the first and second pistons to rotate the ball element and shear the flow conduit or communications line.

A fourth aspect of the disclosure is a process comprising (or consisting essentially of, or consisting of):

a) positioning the ball valve of the first aspect of the disclosure in a flow line;

b) flowing a fluid or slurry through the ball valve and ball member through bores while the ball member is in an open position;

c) exerting force on the first and second pistons to close the ball valve partially or fully by rotating the ball valve member.

A fifth aspect of this disclosure is a riser incorporating one or more ball valves of the present disclosure therein. As used herein "riser" means a standard riser or riser joint, either a low-pressure riser joint or a high-pressure riser joint.

In certain embodiments the ball valves described herein may be operated by and include hydraulic power connections.

These and other features of the ball valves, ball elements and processes of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain ball valves may be devoid of carbon steel. As another example, a ball valve may be devoid of cladding layers.

BRIEF DESCRIPTION OF THE DRAWINGS

The manner in which the objectives of this disclosure and other desirable characteristics can be obtained is explained in the following description and attached drawings in which:

FIGS. 12, 13, 14, and 15 are schematic cross-sectional views through a longitudinal center plane illustrating the ball element of FIG. 1; and FIGS. 16 and 17 are schematic logic diagrams of three process in accordance with the present disclosure.

It is to be noted, however, that the appended drawings of FIGS. 1-15 are not to scale and illustrate only typical ball valve and ball element embodiments of this disclosure. Furthermore, FIGS. 16 and 17 illustrate only two of many possible processes of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
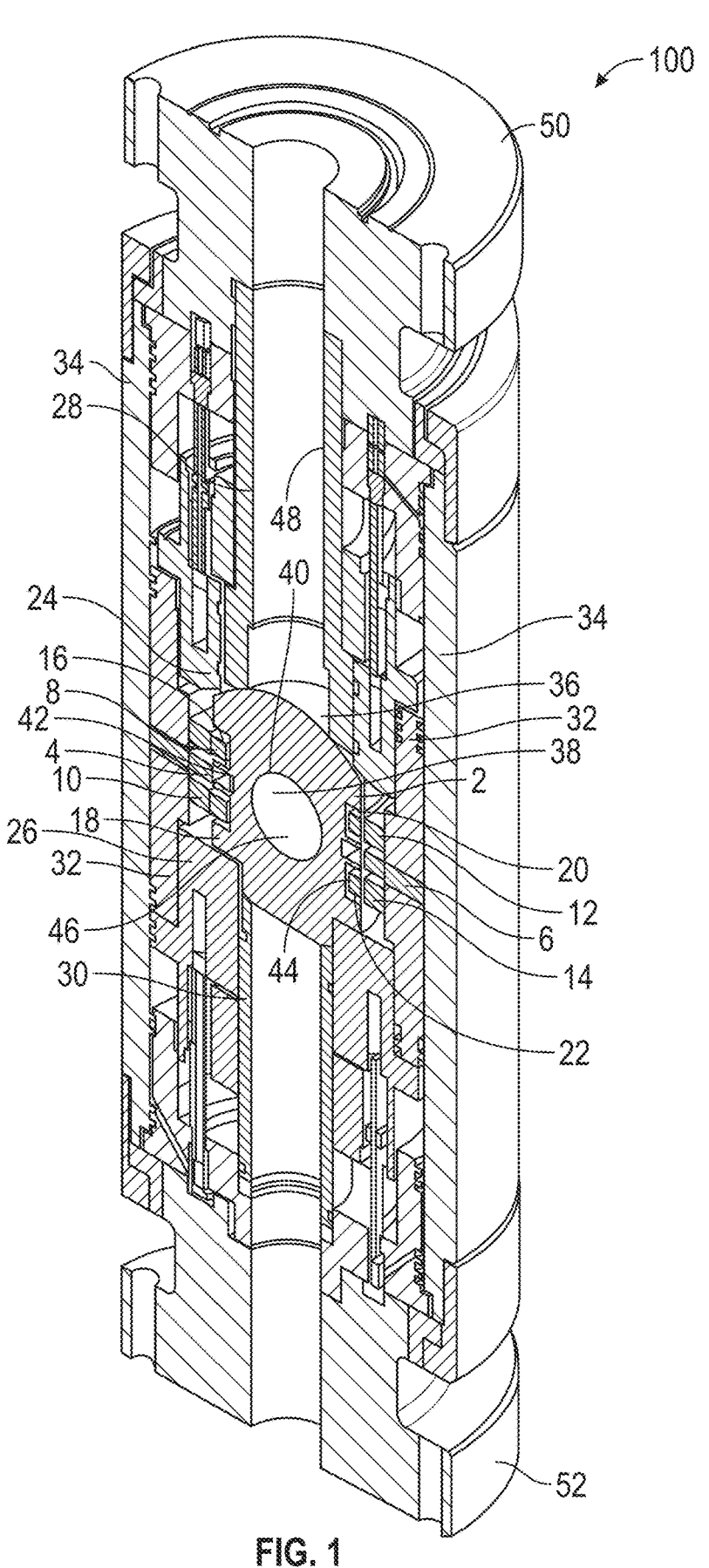
FIG. 1 is a schematic cross-sectional view through a longitudinal center plane illustrating one ball valve embodiment in accordance with the present disclosure.

In the following description, numerous details are set forth to provide an understanding of the disclosed apparatus, combinations, and processes. However, it will be understood by those skilled in the art that the apparatus and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted. As used herein, "API" refers to American Petroleum Institute, Washington, D.C. As used herein, "NACE" refers to the corrosion prevention organization formerly known as the National Association of Corrosion Engineers, now operating under the name NACE International, Houston, Texas. "Psi" refers to pounds per square inch; "ksi" refers to thousand pounds per square inch; "MPa" refers to megapascals; "GPa" refers to gigapascals, all of which are units of pressure.

As mentioned herein, in known ball valves the ball element has a single set of ball rotation pins mounted to a single piston that when driven hydraulically moves in a single direction to open the valve and the opposite direction to close the valve. This has several disadvantages. As the ball rotates about the centerline, forces are not balanced. Ball rotation is dependent on the ball rotation being the result of a reaction force such as from the ball seat. This ball to seat interface can cause extremely high friction particularly if the ball is required to cut an internally conveyed conduit such as wire or coiled tubing. Furthermore, and again relating to the cutting action of the ball, with only a single set of ball rotation pins the strength of the mechanism is sometimes inadequate to cut conveyed conduit, and/or the cutting edges may become damaged. And since pins are the major failure point in these ball valves, having only one set of pins increases the rate of failure. The valves and processes of the present disclosure are directed to these needs.

As further explained herein the ball valves of the present disclosure each feature one or more ball elements, each ball element having a second set of ball rotation pins that mount to a second piston that is hydraulically driven in the opposite direction of a first piston. This has the advantage that the ball rotates about the centerline and forces are balanced, and the rotation of the ball is not dependent on the ball rotation being the result of a reaction such as a seat. Moreover, again relating to the cutting action of the ball, the addition of a second set of pins doubles the strength of the mechanism.

In the following detailed description of the drawing figures, the labels "top", "bottom, "upper", "lower", left", and "right" are merely convenient terminology to assist the reader, and are examples only, intended to describe the ball valves positioned vertically in a subsea riser. There is for example no reason the "left" and "right" features could not be reversed.

Referring now to the drawings, FIG. 1 is a schematic cross-sectional view through a longitudinal center plane illustrating one ball valve embodiment 100 in accordance with the present disclosure. Ball valve embodiment 100 includes the following components:

a ball member 2, a left king pin 4, a right king pin 6, an upper left ball rotation pin 8, a lower left ball rotation pin 10, an upper right ball rotation pin 12, a lower right ball rotation pin 14, an upper left pin slot 16, a lower left pin slot 18, an upper right pin slot 20, a lower right pin slot 22, upper cylindrical operating piston 24, a lower cylindrical operating piston 26, a cylindrical upper ball seat 28, a cylindrical lower ball seat 30, a cylindrical carrier 32, and a cylindrical housing 34.

A ball member sealing surface 36 is illustrated, as is a ball member bore surface 38. A ball member leading edge surface 40 is illustrated. Leading edge surface 40 extends between sealing surface 36 and bore surface 38 defined by the respective through bore, leading edge surface 40 being configured to cut a body extending at least partially through the valve upon closure of the ball member.

Ball member 2 includes a ball member left surface 42 and a right surface 44. Ball member bore surface 38 defines a ball member bore 46 which aligns with a valve flow bore 48 when ball member 2 is rotated into "open" position.

An upper API flange 50 and a lower API flange 52 are illustrated, as are hydraulic fluid channels 54. Hydraulic fluid mechanism and tubing are not illustrated for brevity, but will be understood to be present by those of skill in this art.

Figure 3:
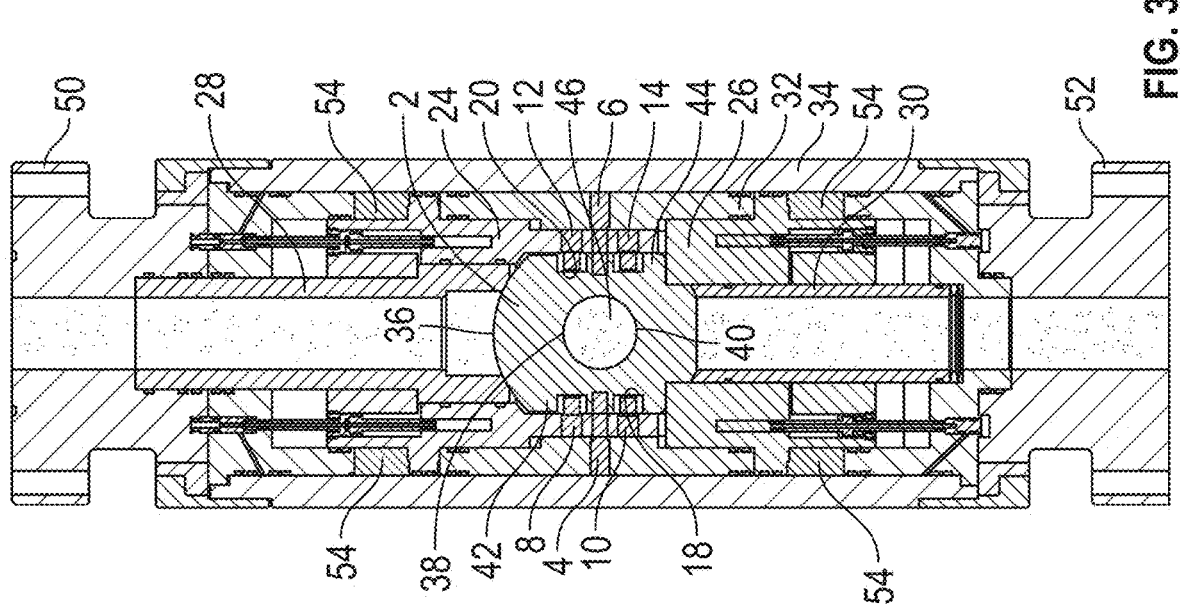
FIGS. 2 and 3 are schematic cross-sectional views through a longitudinal center plane illustrating schematically the valve of FIG. 1 in open position (FIG. 2) and closed position (FIG. 3) when used for cutting.
Figure 2:
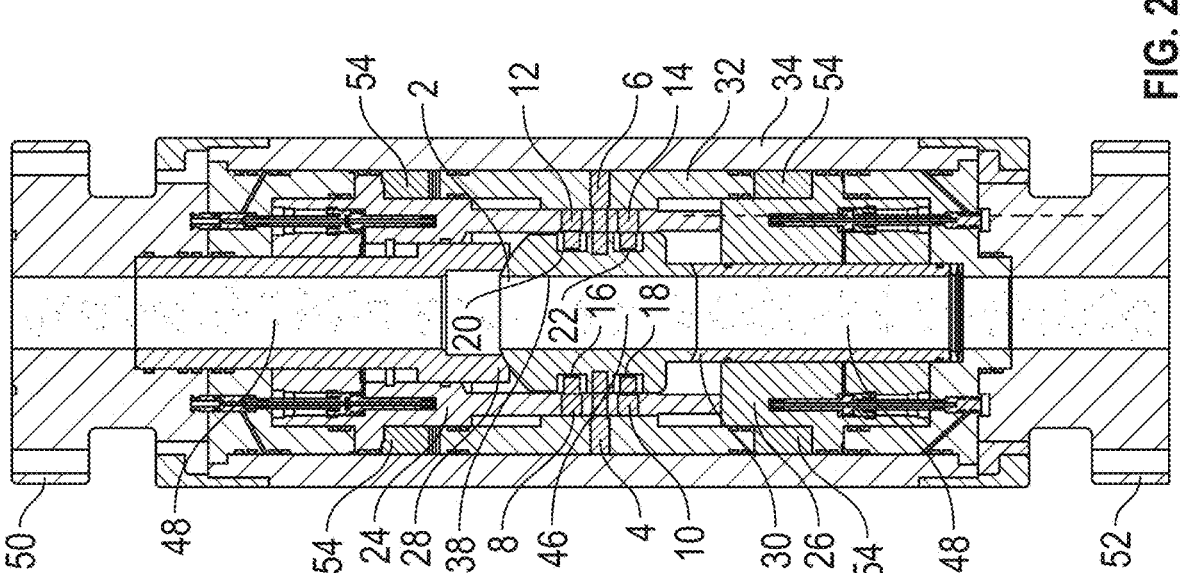

FIGS. 2 and 3 are schematic cross-sectional views through a longitudinal center plane illustrating the valve of FIG. 1 in open position (FIG. 2) and closed position (FIG. 3) when used for cutting.

Figures 4A, 4B, 5, 6:
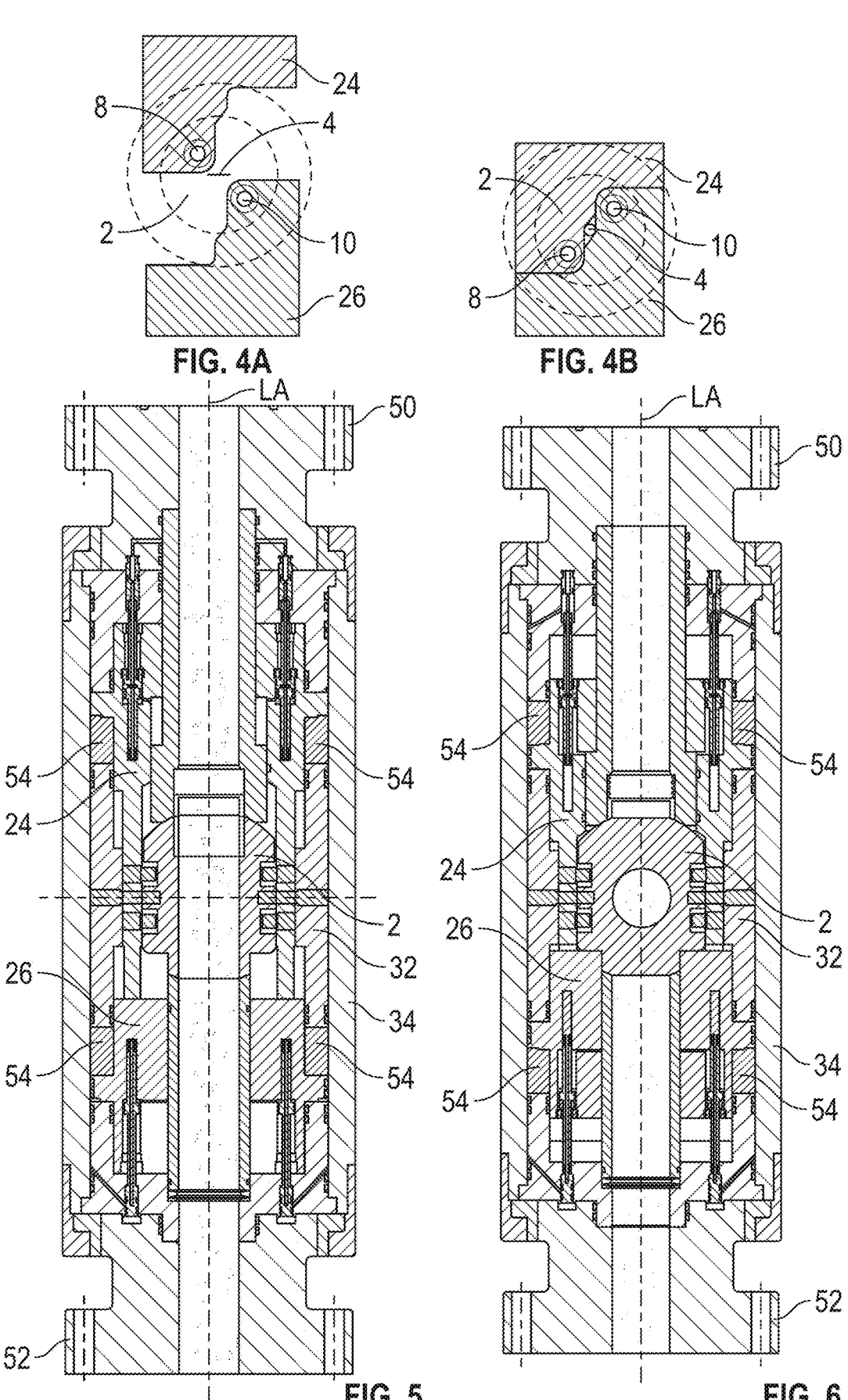
FIGS. 4A and 4B are schematic side elevation views, with parts cut away, of the ball member and pistons of the ball valve illustrated in FIGS. 2 and 3, illustrating the positions of the pistons and pins when the valve is closed (FIG. 4A) and when closed (FIG. 4B)
FIGS. 5, 6, 7, 8, and 9 are schematic cross-sectional views through a longitudinal center plane illustrating the valve of FIG. 1 in a sequence of five stages when used as a flow through valve or during pressure testing.
Figure 9:
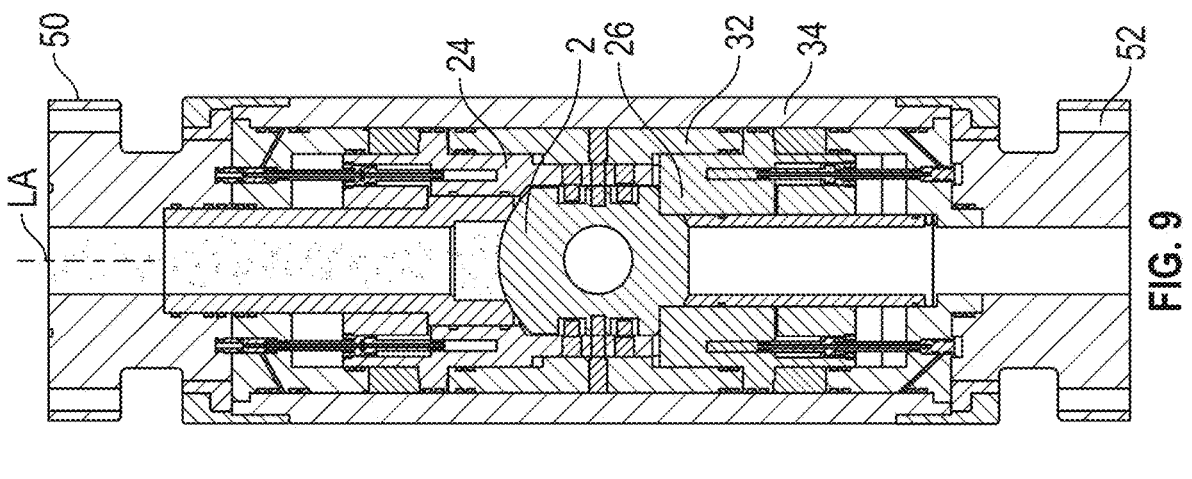
Figure 8:
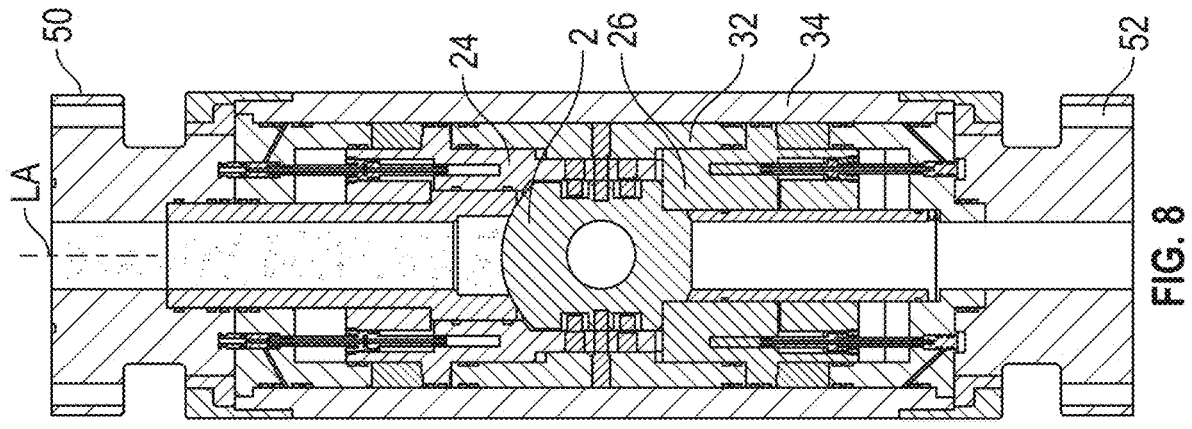

FIGS. 4A and 4B are schematic side elevation views, with parts cut away, of ball member 2 and upper and lower cylindrical operating pistons 24, 26 of the ball valve illustrated in FIGS. 2 and 3, illustrating the positions of the pistons 24, 26 and one pair of ball rotation pins 8, 10 when the valve is closed (FIG. 4A) and when closed (FIG. 4B).

Figure 7:
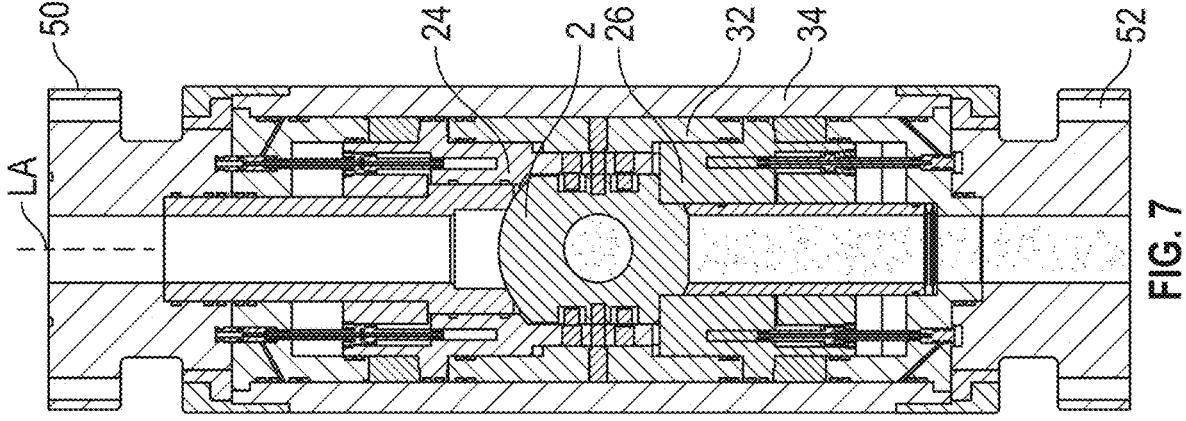

FIGS. 5, 6, 7, 8, and 9 are cross-sectional views through a longitudinal center plane illustrating the valve of FIG. 1 in a sequence of five stages when used as a flow through valve or during pressure testing. In stage 1, as illustrated schematically in FIG. 5, the valve is fully open ("open" position) and fluid or slurry as illustrated schematically by the dotted area below, in, and above ball member 2 flows upward. In stage 2 as illustrated schematically in FIG. 6, the valve is fully closed ("closed" position), and pressure is equalized above and below ball member 2. In stage 3, as illustrated in FIG. 7, the valve is fully closed and pressurized fluid is secured below ball member 2. In stage 4, as illustrated schematically in FIG. 8, the valve is fully closed, and fluid is secured above ball member 2. In stage 5, the valve is fully closed and tested for leaks by pressurized fluid above ball member 2.

Figure 10:
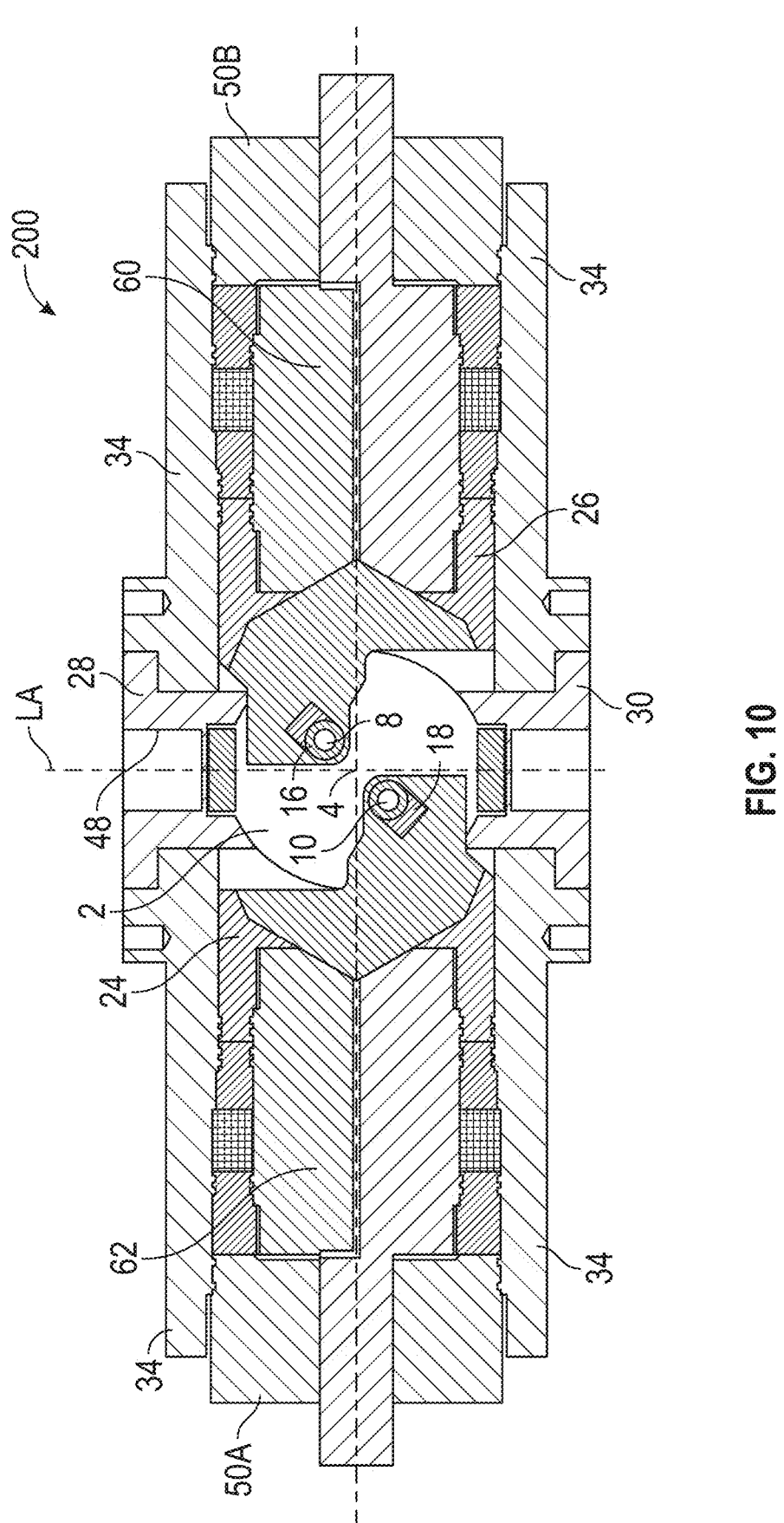
FIGS. 10 and 11 are schematic cross-sectional views through a longitudinal center plane illustrating two other ball valve embodiments in accordance with the present disclosure.
Figure 11:
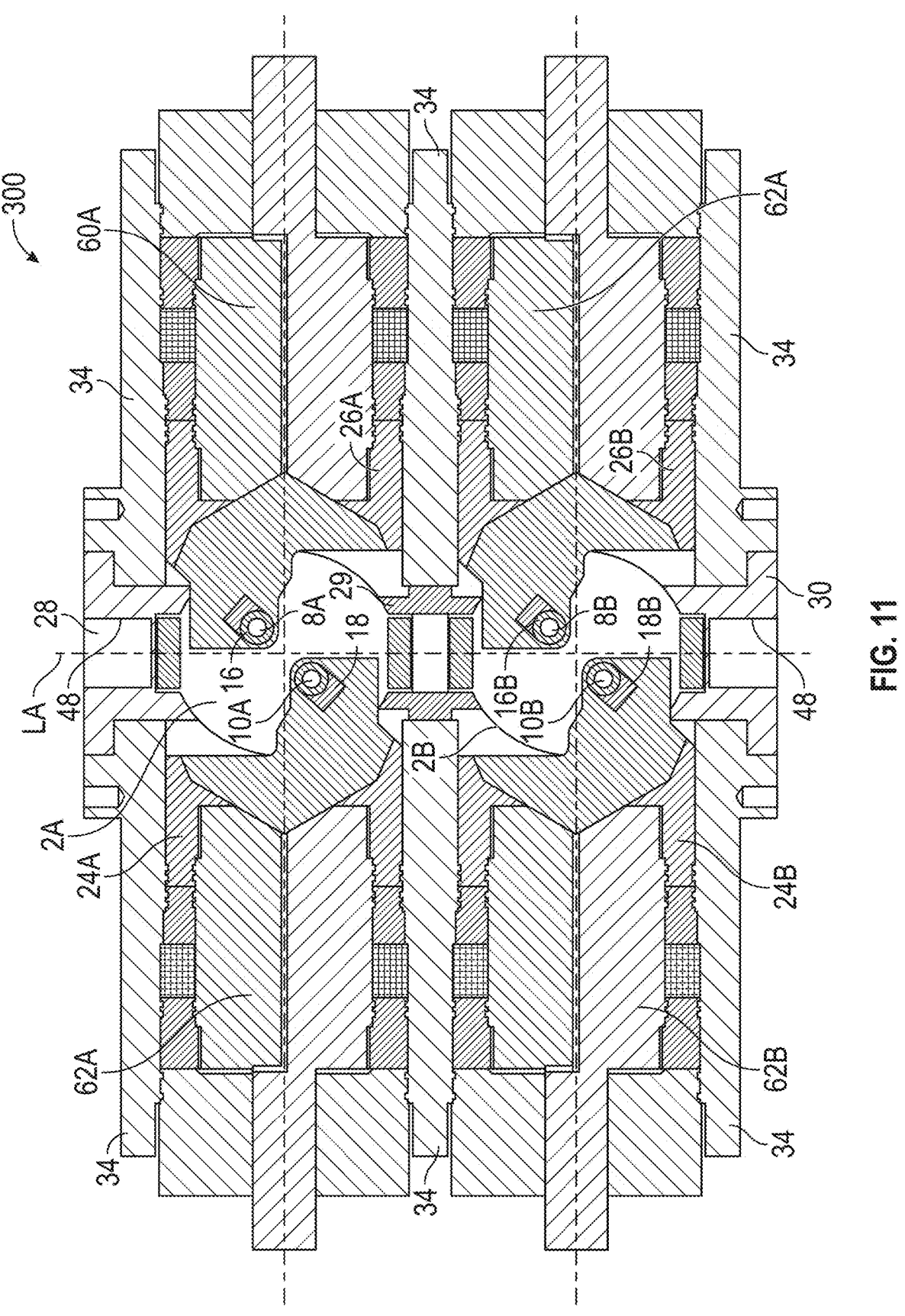

FIGS. 10 and 11 are schematic cross-sectional views through a longitudinal center plane illustrating two other ball valve embodiments 200 and 300 in accordance with the present disclosure. In both embodiments 200 and 300, the pistons 24, 26 move perpendicularly to the flow through bore 48 of the valve. Embodiment 200 has a single ball element 2, and two pistons 24, 26, while embodiment 300 has two ball elements 2A, 2B, and four pistons 24A, 24B, 26A, and 26B. Embodiments 200 and 300 may be advantageous when length in the flow direction needs to be minimized.

FIGS. 12, 13, 14, and 15 are schematic cross-sectional views through a longitudinal center plane illustrating the ball elements of the present disclosure. FIG. 12 illustrates schematically ball element 2 in open position. The double-headed arrows in FIG. 12 illustrate the direction of movement of pins 8, 10 (as well as pins 12, 14 which are not viewable in FIG. 12) when it is desired to rotate ball element 2 into closed position, as illustrated schematically in FIG. 14. FIG. 13 is a schematic cross-section taken along line A-A of FIG. 12. FIG. 15 illustrates schematically ball element 2 without ball rotation pins 8, 10, 12, and 14. It will be understood that ball rotation pins 8, 10, 12, and 14 will be attached to or integrally molded into the ball rotation pistons, not illustrated in FIGS. 12-15.

FIGS. 16 and 17 are schematic logic diagrams of two process embodiments 250 and 350 in accordance with the present disclosure. Embodiment 250 is a process of cutting a flow conduit or communications line, the process comprising (Box 202):

(a) positioning a ball valve in a flow line, the ball valve comprising (i) a cylindrical housing (34) in which is secured a cylindrical carrier (32); an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28,30) and the ball member (2) defining respective through bores;

(ii) the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2);

(iii) the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) configured to accept ends of a corresponding pair of upper left and lower left ball rotation pins (8, 10), and the upper right and lower right pin slots (20, 22) configured to accept ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14) (Box 204);

(b) running a flow conduit or communications line through the through bore of the ball valve (Box 206); and (c) closing the ball valve by exerting force on the first and second pistons to close the ball valve and cut the flow conduit or communications line (Box 208).

Embodiment 350 is a process of regulating a flow in a conduit, the process comprising (Box 302):

(a) positioning a ball valve in a flow line, the ball valve comprising (i) a cylindrical housing (34) in which is secured a cylindrical carrier (32); an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28,30) and the ball member (2) defining respective through bores;

(ii) the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2);

(iii) the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) configured to accept ends of a corresponding pair of upper left and lower left ball rotation pins (8, 10), and the upper right and lower right pin slots (20, 22) configured to accept ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14) (Box 304);

(b) flowing a fluid or slurry through the ball member through bore while the ball member is in an open position (Box 306); and (c) exerting force on the first and second pistons to close the ball valve and regulate the flow in the conduit partially or fully (Box 308).

The ball valves of the present disclosure may be used in pressured risers and conduits. The pressure may, in some embodiments, be from about 500 psi to about 15,000 psi or greater; alternatively greater than about 700 psi; alternatively greater than about 800 psi; alternatively greater than about 1,000, or greater than about 2,000 psi, or greater than about 3,000 psi. For example, pressures may range from about 2,000 to about 5,000 psi; or from about 2,500 to about 4,500 psi; or from about 3,000 to about 4,000; or from about 2,500 to about 5,000 psi; or from about 2,000 to about 4,500 psi; or from about 2,000 to about 3,000 psi; or from about 4,000 to about 5,000 psi; or from about 3,000 to about 10,000 psi; or from about 4,000 to about 8,000 psi; or from about 5,000 to about 15,000 psi. All ranges and sub-ranges (including endpoints) between about 500 psi and about 15,000 psi are considered explicitly disclosed herein.

In certain embodiments the ball valves may have a service trim of HH (API 6A), which is used in a highly corrosive and extreme service environment. The valve housing and carrier in these embodiments may both be made from 4130 steel and may have an alloy 625 Inconel inlay throughout. 4130 steel is a chromium-molybdenum alloy steel and is considered a low carbon steel. It has a density of 7.85 g/cm$^3$ (0.284 lb./in$^3$) and benefits from heat-treatment hardening. It is an exceptional welding steel, being weldable in all commercial methods, and is readily machined in its normalized/tempered condition. 4130 steel is easily cold worked, hot worked, and forged, but cannot be aged. It has excellent ductility when annealed and is a through-hardening alloy. Some properties of 4130 steel are provided in Tables 1 and 2. Alloy 625 is a nonmagnetic, corrosion- and oxidation-resistant, nickel-based alloy. Its strength and toughness in the temperature range cryogenic to 2000 F (1093 C) are derived from the solid solution effects of the refractory metals, columbium and molybdenum, in a nickel-chromium matrix. The alloy has excellent fatigue strength and stress-corrosion cracking resistance to chloride ions. Some properties of alloy 625 are provided in Tables 3 and 4.

TABLE 1

| 4130 steel chemical composition | |
|---|---|
| Element | Percentage |
| Carbon | 0.28-0.33 |
| Chromium | 0.8-1.1 |
| Manganese | 0.7-0.9 |
| Molybdenum | 0.15-0.25 |
| Phosphorus | <=0.035 |
| Silicon | 0.15-0.35 |
| Sulphur | <=0.04 |

TABLE 2

| 4130 steel mechanical properties | | |
|---|---|---|
| Mechanical Properties | Metric | English |
| Modulus of Elasticity | 205 GPa | 29700 ksi |
| Ultimate Tensile Strength | 670 MPa | 97200 psi |
| Tensile Yield Strength | 435 MPa | 63100 psi |
| Rockwell B Hardness | 92 | 92 |
| Elongation at Break | 25.5% | 25.5% |

TABLE 3

| Alloy 625 chemical composition | |
|---|---|
| Element | Percentage |
| Carbon | 0.10 max. |
| Nickel | balance |
| Chromium | 20.0-23.0 |
| Iron | 5.00 max. |
| Silicon | 0.50 max |
| Manganese | 0.50 max |
| Sulfur | 0.015 max. |
| Phosphorus | 0.015 max. |
| Molybdenum | 8.00-10.0 |
| Titanium | 0.40 max. |
| Cobalt | 1.00 max. |
| Columbium + Tantalum | 3.15-4.15 |
| Aluminum | 0.40 max. |

TABLE 4

| | | Alloy 625 mechanical properties | | | |
|---|---|---|---|---|---|
| Condition | Form | Ultimate Tensile Strength, ksi (MPa) | Yield Strength at 0.2% offset, ksi (MPa) | Elonga- tion in 2" percent | Hardness, Rockwell |
| Annealed at 1925° F. (1052° C.), rapid cooled | Sheet 0.014- 0.063" thick | 132.0 (910) | 67.9 (468) | 47 | B94 |
| Annealed at 1925° F. (1052° C.), rapid cooled | Sheet,* 0.0.78- 0.155" thick | 131.5 (907) | 67.4 (465) | 45 | B97 |
| Annealed at 1925° F. (1052° C.), rapid cooled | Plate, ¼" ½" ¾" 1.00" 1½" 1¾" | 132.0 (910) 130.0 (896) 132.3 (912) 127.2 (877) 127.3 (878) 128.0 (883) | 65.5 (452) 67.0 (462) 80.0 (552) 75.3 (519) 73.7 (508) 66.0 (455) | 46 44 44 42 43 44 | B94 B98 B98 B97 B97 C20 |

In certain embodiments the valve upper and lower ball seats, pistons, king pins, and ball rotation pins may all be made from 718 Inconel, and seal ring gaskets may be 316 Stainless Steel. Some properties of alloy 718 Inconel are provided in Tables 5 and 6.

TABLE 5

| Alloy 718 chemical composition | |
|---|---|
| Element | Percentage |
| Carbon | 0.08 max. |
| Nickel + Cobalt | 50.00-55.00 |
| Chromium | 17.00-21.00 |
| Iron | balance |
| Silicon | 0.35 max |
| Manganese | 0.35 max |
| Sulfur | 0.015 max. |
| Phosphorus | 0.015 max. |
| Molybdenum | 2.80-3.30 |
| Titanium | 0.65-1.15 |
| Cobalt | 1.00 max. |
| Boron | 0.006 max. |
| Copper | 0.30 max. |
| Aluminum | 0.20-0.80 |

TABLE 6

| | Alloy 718 mechanical properties | | |
|---|---|---|---|
| Temperature (F.) | Young's Modulus ksi × 10³ | Tortional Modulus ksi × 10³ | Poisson's Ratio |
| 70 | 29.0 | 11.2 | 0.294 |
| 100 | 28.8 | 11.2 | 0.291 |
| 200 | 28.4 | 11.0 | 0.288 |

TABLE 6-continued

| | Alloy 718 mechanical properties | | |
|---|---|---|---|
| Temperature (F.) | Young's Modulus ksi × 10³ | Tortional Modulus ksi × 10³ | Poisson's Ratio |
| 300 | 28.0 | 10.9 | 0.280 |
| 400 | 27.6 | 10.8 | 0.280 |
| 500 | 27.1 | 10.6 | 0.275 |
| 600 | 26.7 | 10.5 | 0.272 |
| 700 | 26.2 | 10.3 | 0.273 |
| 800 | 25.8 | 10.1 | 0.271 |
| 900 | 25.3 | 9.9 | 0.272 |
| 1000 | 24.8 | 9.7 | 0.271 |
| 1100 | 24.2 | 9.5 | 0.276 |
| 1200 | 23.7 | 9.2 | 0.283 |
| 1300 | 23.0 | 8.9 | 0.292 |
| 1400 | 22.3 | 8.5 | 0.306 |
| 1500 | 21.3 | 8.1 | 0.321 |
| 1600 | 20.2 | 7.6 | 0.331 |
| 1700 | 18.8 | 7.1 | 0.334 |
| 1800 | 17.4 | 6.5 | 0.341 |
| 1900 | 15.9 | 5.8 | 0.366 |
| 2000 | 14.3 | 5.1 | 0.402 |

In certain embodiments the ball valves of the present disclosure may have a service temperature ranging from about 32 to about 250° F.

In certain embodiments the ball valves and ball elements of the present disclosure may have a bore size of 7⅜ inches or greater.

In certain embodiments the ball valves of the present disclosure may have have a PSL of 3.

In certain embodiments the ball valves of the present disclosure may have an API 6A 13⅝ inch studded top connection, and an API 6A 13⅝ inch flanged bottom connection.

In certain embodiments the ball elements of the ball valves of the present disclosure may be able to cut coiled tubing up to 2 inch diameter at 140 ksi, slick line of 5/16 inch diameter (braided or slick), and Eline of 7/32 inch diameter.

In certain embodiments the ball valves of the present disclosure may be NACE compliant under MR 1075.

In certain embodiments the ball valves of the present disclosure may be compliant with API Spec 6A PR2, PSL3, 17D for actuator; and for slurry testing, meet standards 17 G Class B or to API 6AV1 minimum.

In certain embodiments the ball valves may comprise ball elements and ball seats comprised of INCONEL 718 base material with faces coated in tungsten carbide. In certain embodiments the ball body (housing) and internal components may be AISI 8630 or equivalent with INCONEL 625 cladding at critical seal areas. Tables 7 and 8 provides details of one non-limiting ball valve embodiment specific for certain subsea riser usage.

TABLE 7

| Ball Valve Standards, Limits, and Physical Details | | |
|---|---|---|
| Applicable Standards | | |
| ARI 17G/ 6A PSL 3 | Design and Manufacture of Subsea Well Intervention Equipment | Design, Manufacture and Quality Assurance |
| API 17G/ 6A PR2 | Design and Manufacture of Subsea Well Intervention Equipment. | Testing |
| MR-01-75 | NACE Compliance | |

TABLE 7-continued

| Ball Valve Standards, Limits, and Physical Details | | | |
|---|---|---|---|
| | Value | Units | Comments |
| Operation Limits | | | |
| Max. Working Pressure | 15,000 | psi | Internal bore |
| Max. Test Pressure | 22,500 | psi | Internal bore Test |
| Max. Working Temp. | 250 | F. | |
| Min. Working Temp. | 32 | F. | |
| Max. Shut-in Pressure below Ball | 15,000 | psi | |
| Max. Pressure test above Ball | 15,000 | psi | |
| Max. Control Chamber Working Pressure. | 15,000 | psi | |
| Max. Control Chamber Test Pressure. | 22,500 | psi | |
| Min. Bending Capacity | TBD | Lb. | Minimum |
| Close ratio to hold pressure from Above | 0.64:1 | | Hold ratio i.e., 13,000 psi for 20 ksi test from above. |
| Cutting Capacity | Min. | | 2" × 0.204" WT. 140,000 PSI Coiled Tubing |
| Physicals | | | |
| Overall Length | 118 | Inches | |
| Major Diameter | 36 | Inches | |
| Bore | 7.375 | Inches | |
| End Connections | 13⅝" | | API 15,000 psi Flange |
| Hydraulic Control Lines | Qty: 2 | | 1 × ¼" Open Feed and 1 × ¼" Close feed |
| Chemical Injection Line | Qty: 1 | | N/A |

TABLE 8

| | Value | Units | Comments |
|---|---|---|---|
| Pump thro' Closed Ball from above | | | YES, Ball system senses differential & opens |
| Ball Position Indicators | | | Not Currently |
| Fall AS-IS | | | YES, Valve is hydraulically balanced |
| Double Seal Isolation (HNBR & PEEK) | | | In all seal locations |
| ¼" Hydraulic Control Line | 15,000 | psi | Open |
| | 15,000 | psi | Close |
| Ball and seats will be Inconel 718 base material with sealing faces coated in Tungsten Carbide. | | | |
| Body and internal componer ts will be AISI 8630 or equivalent with Inconel 625 cladding at critical seal areas. | | | |

Cutting Advantages

Double set of ball drive pins halves individual pin stress.
  Double pistons acting against each other utilize the double
    drive pin mechanism to rotate the ball about the center,
    thus eliminating the considerable ball to seat friction
    encountered in conventional ball valves during the
    cutting process.
  Cutting edge is comprised of both hard guillotine style
    inserts within the ball and seat face. This increases the
    efficiency of the cutting edge.
  Ball pin cycle travel is a minimum double that of con-
    ventional systems which translates into a mechanical
    advantage of 2×.
Work Valve Highlights
  Ball rotation, as illustrated schematically herein, reduces
    cutting force by 50%.
  Dual seals throughout the valves of the present disclosure
    create redundant sealing. Seal ring gaskets may be 316
    stainless steel.

Certain embodiments may comprise a Honeywell pres-
  sure and/or temperature port (Honeywell or equivalent)
  to read pressure below closed valve.
Certain embodiments may comprise a chemical injection
  port to prevent hydrates from forming around the ball.
  Proven piston design.
  As mentioned earlier, FIGS. 5-9 illustrate schematically
bore pressure sealing from below and above. Pump through
capability is to prevent opening valve under pressure. Hav-
ing the option to use this valve as a test valve saves the
exposure and risk of damaging lower testing of the LWI
system. As used herein, LWI means "Light well interven-
tion." Subsea LWI systems can be defined as those systems
which provide some form of direct access to the wellbore,
without requiring the use of an offshore drilling unit or a
standard drilling marine riser. A wide variety of such sys-
tems have been developed, including conventional rigid
workover risers, subsea wireline systems and reeled tubing
systems as described in the following subclauses. Other subsea LWI systems are also feasible and may be deployed in the future, e.g. flexible riser systems. (*API RP 17A, Design and Operation of Subsea Production Systems— General Requirements and Recommendations, Fourth Edition, Reaffirmed* 2011.)

Advantages of the Ball Valves as Work Valves

Ball valves contain a double set of ball drive pins which reduces individual pin stress by half.

The double pistons acting against each other utilizing the double drive pin mechanism to rotate the ball about the center eliminates considerable ball-to-seat friction encountered in conventional ball valve designs. This design ensures most of the generated force focuses on the actual cut being performed. (Conventional cutting efficiency declines rapidly due to friction as the load is increased until the mechanism completely stalls and ultimately bending and breaking the drive pins).

In certain end uses, such as the HWCG Open Water application which removes the constraint of the marine riser ID, allows the ball valves of the present disclosure to incorporate hardened guillotine style inserts within both the ball face and seat face which increases the efficiency of the cutting edge. "HWCG" refers to Helix Well Containment Group, or HWCG LLC, Houston, TX.

With respect specifically to use of the ball valves of the present disclosure in MPD (managed pressure drilling), systems and processes of the present disclosure enable possible variants of MPD operations. These variants include, but are not limited to, applied surface backpressure MPD (SBP MPD); floating, dynamic and pressurized mud cap drilling (FMCD, DMCD and PMCD); and Dual Gradient Drilling (DGD). Redundancy of components in the ball valves allows for extended service periods and mitigates risk of downtime due to component failure.

Advantageously, most of the components of systems and processes of the present disclosure may be sourced from existing pieces of equipment used in the oil and gas drilling industry, for conventional drilling, MPD or other operations. Some of the components of the systems of the present disclosure may be based on existing equipment, which require modifications for remote/subsea operation. The innovative nature of the ball valves and processes of the present disclosure relies on the concept of dual ball rotation pins on the top (or left) and dual rotation pins on the bottom (or right) of the ball member.

Ball valves and processes of the present disclosure may be operated using hydraulic and/or electric power. In certain embodiments, both electric and hydraulic power supply may have redundant and/or back up power supply. In certain embodiments, hydraulic power may require installation of an additional hydraulic unit on the drilling rig, possibly including storage for pressurized fluid for backup power. In certain embodiments, the drilling unit's electric generators may provide electric power, and backup power may be provided by an uninterruptible power supply (UPS) battery system.

Any known type riser joints may be employed in practicing the systems and processes of the present disclosure. Suitable riser joints and components typically used therewith include the marine risers described in U.S. Pat. Nos. 4,234,047; 4,646,840; 4,762,180; 6,082,391; and 6,321,844; and marine free-standing risers discussed in U.S. Pat. Nos. 7,434,624; 8,960,302 and 9,297,214, as well as published U.S. patent applications 20070044972 and 20080223583. See also Hatton, et al, "Recent Developments in Free Standing Riser Technology", 3rd Workshop on Subsea Pipelines, Dec. 3-4, 2002, Rio de Janeiro, Brazil. Concentric offset risers are discussed in Szucs et al., "*Heavy Oil Gas Lift Using the COR*", Soc. of Petroleum Engrs. (SPE) 97749 (2005). American Petroleum Institute (API) Recommended Practice 2RD, (API-RP-2RD), First Edition, June 1998), "*Design of Risers for Floating Production Systems (FPSs) and Tension-Leg Platforms (TLPs)*" is a standard in the subsea oil and gas production industry. Concentric risers are discussed in *Subsea Engineering Handbook*, page 437, (published December 2010).

Certain components made comprise MONEL, HASTEL-LOY, titanium, alloy 20, aluminum, or other corrosion-resistant machinable metal. Corrosion-resistant alloys may be preferred in certain sour gas or other service where $H_2S$ or acid gases or vapors may be expected, such as T304 stainless steel (or analogs thereof), or the alloy known under the trade designation MONEL® nickel-copper alloy 400. The composition and some physical properties of MONEL® nickel-copper alloy 400 are summarized in Tables 9 and 10 (from Publication Number SMC-053 Copyright @ Special Metals Corporation, 2005). The composition and some physical properties of T304 and T316 stainless steels are summarized in Tables 11 and 12. Seal ring gaskets may be 316 Stainless Steel. MONEL® nickel-copper alloy 400 (equivalent to UNS N04400/W.Nr. 2.4360 and 2.4361) is a solid-solution alloy that can be hardened only by cold working. It has high strength and toughness over a wide temperature range and excellent resistance to many corrosive environments. The skilled artisan, having knowledge of the particular application, pressures, temperatures, and available materials, will be able design the most cost effective, safe, and operable system components for each particular application without undue experimentation.

TABLE 9

| Chemical Composition, wt. %, of MONEL ® Alloy 400 | |
| --- | --- |
| Nickel (plus Cobalt) | 63.0 min. |
| Carbon | 0.3 max. |
| Manganese | 2.0 max. |
| Iron | 2.5 max. |
| Sulfur | 0.024 max. |
| Silicon | 0.5 max. |
| Copper | 28.0-34.0 |

TABLE 10

| Physical Constants of MONEL ® Alloy 400[a] | |
| --- | --- |
| Density, g/cm³ | 8.80 |
| lb/in.³ | 0.318 |
| Melting range, ° F. | 2370-2460 |
| ° C. | 1300-1350 |
| Modulus of Elasticity, 10³ ksi | |
| Tension | 26.0 |
| Compression | 26.0 |
| Torsion | 9.5 |
| Poisson's Ratio | 0.32 |
| Curie Temperature, ° F. | 70-120 |
| ° C. | 21-49 |

[a]these values also apply to MONEL alloy R-405, the free-machining version of MONEL alloy 400.

15

TABLE 11

Chemical Composition, wt. %, of T304 and T316 SS

|  | T304 | T316 |
|---|---|---|
| Carbon | 0.08 max. | 0.08 |
| Chromium | 18-20 | 18 max. |
| Manganese | 2.0 max. | 2 |
| Molybdenum | 0 | 3 max. |
| Iron | 66.345-74 | 62 |
| Nickel | 8-10.5 | 14 max. |
| Phosphorous | 0.045 max. | 0.045 |
| Sulfur | 0.03 max. | 0.03 |
| Silicon | 1 max. | 1 |

TABLE 12

Physical Constants of T304 and T316 SS

|  | T304 | T316 |
|---|---|---|
| Density, g/cm$^3$ | 8 | 8 |
| lb/in.$^3$ | 0.289 | 0.289 |
| Melting range, ° F. | 2550-2650 | 2500-2550 |
| ° C. | 1400-1455 | 1370-1400 |
| Modulus of Elasticity, 10$^3$ ksi | 28-29 | 28 |
| Poisson's Ratio | 0.29 | |
| CTE, linear 250° C. | 9.89 μin/in-° F. | 9 μin/in-° F. |

The ball valves of the present disclosure may be built to meet ISO standards, Det Norske Veritas (DNV) standards, American Bureau of Standards (ABS) standards, American Petroleum Institute (API) standards, and/or other standards.

What has not been recognized or realized are ball valves, ball elements for same, and processes for using same that are robust and safe. Ball valves, ball elements, and processes to accomplish this without significant risk to workers is highly desirable.

In alternative embodiments, one or more of the various components may be ornamented with various ornamentation produced in various ways (for example stamping or engraving, or raised features such as reflectors, reflective tape, patterns of threaded round-head screws or bolts), such as facility designs, operating company designs, logos, letters, words, nicknames (for example TREWHELLA, and the like). The ball valves may include optional hand-holds and/or lifting features, which may be machined or formed to have easy-to-grasp features for fingers and lifting cranes or may have rubber grips shaped and adorned with ornamental features, such as raised knobby gripper patterns.

From the foregoing detailed description of specific embodiments, it should be apparent that patentable ball valves, combinations, and processes have been described. Although specific embodiments of the disclosure have been described herein in some detail, this has been done solely for the purposes of describing various features and aspects of the ball valves, ball elements and processes and is not intended to be limiting with respect to their scope. It is contemplated that various substitutions, alterations, and/or modifications, including but not limited to those implementation variations which may have been suggested herein, may be made to the described embodiments without departing from the scope of the appended claims. Some ball valves and elements of this disclosure may be devoid of certain components and/or features: for example, valves and ball elements devoid of high carbon steel, and valves devoid of low-strength steels.

16

What is claimed is:

1. A ball valve comprising:
   a) a ball member (2) mounted within a carrier (32) and rotatable relative to upper and lower ball seats (28, 30) about a left king pin (4) and a right king pin (6) between open and closed positions;
   b) the ball member (2) comprising a sealing surface (36), a bore surface (38) defining the through bore, a leading edge surface (40) extending between the sealing surface (36) and the bore surface (38), the leading edge surface (40) being configured to cut a body extending at least partially through the through bore surface (38) upon closure of the ball member (2);
   c) the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) accepting ends of a corresponding pair of upper left and lower left ball rotation pins (8, 10), and the upper right and lower right pin slots (20, 22) accepting ends of a corresponding pair of upper right and lower right ball rotation pins (12, 14);
   d) the upper left and lower left ball rotation pins (8, 10), and the upper right and lower right ball rotation pins (12, 14) operated by upper and lower cylindrical operating pistons (24, 26) such that when the upper and lower cylindrical operating pistons (24, 26) are driven towards the ball member (2) in opposite directions, the ball member (2) rotates to the closed position.

2. The ball valve of claim 1
   a) the ball member (2) mounted within the cylindrical carrier (32) and being rotatable relative to the upper and lower ball seats (28, 30) about the left king pin (4) and the right king pin (6) between open and closed positions;
   b) the upper ball seat (28) and the lower ball seat (30) arranged in and secured to the cylindrical carrier (32);
   c) a cylindrical housing (34) in which is secured the cylindrical carrier (32).

3. The ball valve of claim 2 wherein the respective through bores of the ball seat and the ball member define a flow path through the valve, wherein the ball member is rotated relative to the upper and lower ball seats to misalign the respective through bores to prevent or restrict flow through the ball valve, and is rotated relative to the upper and lower ball seats to align the respective through bores to permit or increase flow through the ball valve.

4. A riser comprising one or more of the ball valves of claim 2.

5. The ball valve of claim 2 configured to contain pressure ranging from about 500 psi to about 15,000 psi.

6. The ball valve of claim 2 having a service trim configured for use in a highly corrosive and high pressure environment, the cylindrical housing and the cylindrical carrier comprising a low carbon, heat-treat hardened chromium-molybdenum alloy steel having a density of 7.85 g/cm$^3$ (0.284 lb./in$^3$), and an alloy inlay throughout, wherein the alloy inlay is a nonmagnetic, corrosion-resistant and oxidation-resistant nickel-based alloy comprising a solid solution of columbium and molybdenum in a nickel-chromium matrix.

7. The ball valve of claim 6 wherein the low carbon, heat-treat hardened chromium-molybdenum alloy steel consists essentially of:

| Element | Percentage |
|---|---|
| Carbon | 0.28-0.33 |
| Chromium | 0.8-1.1 |
| Manganese | 0.7-0.9 |
| Molybdenum | 0.15-0.25 |
| Phosphorus | less than or equal to 0.035 |
| Silicon | 0.15-0.35 |
| Sulphur | less than or equal to 0.04. |

8. The ball valve of claim 6 wherein the nonmagnetic, corrosion-resistant and oxidation-resistant nickel-based alloy consists essentially of:

| Element | Percentage |
|---|---|
| Carbon | 0.10 max. |
| Nickel | balance |
| Chromium | 20.0-23.0 |
| Iron | 5.00 max. |
| Silicon | 0.50 max |
| Manganese | 0.50 max |
| Sulfur | 0.015 max. |
| Phosphorus | 0.015 max. |
| Molybdenum | 8.00-10.0 |
| Titanium | 0.40 max. |
| Cobalt | 1.00 max. |
| Columbium + Tantalum | 3.15-4.15 |
| Aluminum | 0.40 max.. |

9. The ball valve of claim 2 wherein the upper and lower ball seats, the upper left and lower left ball rotation pins (8, 10), the upper right and lower right ball rotation pins (12, 14), and the king pins comprise a low carbon alloy consisting essentially of:

| Element | Percentage |
|---|---|
| Carbon | 0.08 max. |
| Nickel + Cobalt | 50.00-55.00 |
| Chromium | 17.00-21.00 |
| Iron | balance |
| Silicon | 0.35 max |
| Manganese | 0.35 max |
| Sulfur | 0.015 max. |
| Phosphorus | 0.015 max. |
| Molybdenum | 2.80-3.30 |
| Titanium | 0.65-1.15 |
| Cobalt | 1.00 max. |
| Boron | 0.006 max. |
| Copper | 0.30 max. |
| Aluminum | 0.20-0.80. |

10. The ball valve of claim 2, wherein the ball member through bore has a bore size of 7⅜ inches or greater.

11. The ball valve of claim 2 configured to cut coiled tubing up to 2 inch diameter at 140 ksi, slick line of 5/16 inch diameter (braided or slick), and/or Eline of 7/32 inch diameter.

12. A process of cutting a flow conduit or communications line, the process comprising:
(a) positioning a ball valve in a flow line, the ball valve comprising
(i) a cylindrical housing (34) in which is secured a cylindrical carrier (32), an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28,30) and the ball member (2) defining respective through bores;
(ii) the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2);
(iii) the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) accepting ends of a corresponding pair of upper left and lower left ball rotation pins (8, 10), and the upper right and lower right pin slots (20, 22) accepting ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14);
(b) running a flow conduit or communications line through the through bore of the ball valve; and
(c) closing the ball valve by exerting force on the upper cylindrical operating piston and the lower cylindrical operating piston to close the ball valve and cut the flow conduit or communications line.

13. The process of claim 12 wherein the running of the flow conduit or communications line through the through bore of the ball valve occurs during a managed pressure operation selected from the group consisting of surface backpressure MPD (SBP MPD), floating mud cap drilling (FMCD), dynamic mud cap drilling (DMCD), pressurized mud cap drilling (PMCD), Dual Gradient Drilling (DGD), underbalanced drilling (UBD).

14. The process of claim 12 wherein the closing of the ball valve occurs during a managed pressure operation selected from the group consisting of surface backpressure MPD (SBP MPD), floating mud cap drilling (FMCD), dynamic mud cap drilling (DMCD), pressurized mud cap drilling (PMCD), Dual Gradient Drilling (DGD), underbalanced drilling (UBD), comprising controlling the subsea pressure management sub-system and the modified riser joint from the floating vessel via the use of one or more umbilicals.

15. A process of regulating a flow in a conduit, the process comprising:
(a) positioning a ball valve in a flow line, the ball valve comprising
(i) a cylindrical housing (34) in which is secured a cylindrical carrier (32); an upper ball seat (28) and a lower ball seat (30) arranged in and secured to the carrier (32); a ball member (2) mounted within the carrier (32) and being rotatable relative to the upper and lower ball seats (28, 30) about a left king pin (4) and a right king pin (6) between open and closed positions; the upper and lower ball seats (28,30) and the ball member (2) defining respective through bores;

(ii) the ball member (2) comprising a sealing surface (36), a bore surface (38), a leading edge surface (40) extending between the sealing surface (36) and the bore surface (38) defined by the respective through bore, the leading edge surface (40) being configured to cut a body extending at least partially through the valve upon closure of the ball member (2);

(ii) the ball member (2) further comprising a left surface (42) and a right surface (44), an upper left pin slot (16) and a lower left pin slot (18) in the ball member left surface (42), and an upper right pin slot (20) and a lower right pin slot (22) in the ball member right surface (44), the upper left and lower left pin slots (16, 18) accepting ends of a corresponding pair of upper left and lower left ball rotation pins (8, 10), and the upper right and lower right pin slots (20, 22) accepting ends of a corresponding pair of upper right and lower right ball rotation pins (12, 14); an upper cylindrical operating piston (24) connected to the upper left ball rotation pin (8) and to the upper right ball rotation pin (12), and a lower cylindrical operating piston (26) connected to the lower left ball rotation pin (10) and to the lower right ball rotation pins (14);

(b) flowing a fluid or slurry through the ball member through bore while the ball member is in an open position; and (c) exerting force on the first and second pistons to close the ball valve and regulate the flow in the conduit partially or fully.

16. The process of claim 15 wherein the flowing of the fluid or slurry through the ball member through bore while the ball member is in an open position is performed during a managed pressure operation selected from the group consisting of surface backpressure MPD (SBP MPD), floating mud cap drilling (FMCD), dynamic mud cap drilling (DMCD), pressurized mud cap drilling (PMCD), Dual Gradient Drilling (DGD), underbalanced drilling (UBD).

17. The process of claim 15 wherein the exerting force on the first and second pistons to close the ball valve is performed during a managed pressure operation selected from the group consisting of surface backpressure MPD (SBP MPD), floating mud cap drilling (FMCD), dynamic mud cap drilling (DMCD), pressurized mud cap drilling (PMCD), Dual Gradient Drilling (DGD), underbalanced drilling (UBD).

* * * * *